United States Patent [19]

Turner

[11] 3,981,211

[45] Sept. 21, 1976

[54] SELF-CENTERING TOOL HOLDING APPARATUS

[76] Inventor: Clarence A. Turner, 2028 Floral Ave., Charlotte, N.C. 28203

[22] Filed: June 13, 1975

[21] Appl. No.: 586,554

[52] U.S. Cl. .................................. 82/36 R; 82/31
[51] Int. Cl.² ........................................ B23B 29/04
[58] Field of Search ................. 82/36 R, 34 R, 31

[56] References Cited
UNITED STATES PATENTS

| | | | |
|---|---|---|---|
| 441,834 | 12/1890 | Freeman | 82/36 R |
| 1,435,873 | 11/1922 | Petersen | 82/36 R |
| 1,718,279 | 6/1929 | Dwyer | 82/36 R |
| 3,691,883 | 9/1972 | Ingram | 82/34 R |

Primary Examiner—Leonidas Vlachos
Attorney, Agent, or Firm—Bell, Seltzer, Park & Gibson

[57] ABSTRACT

A tool holding apparatus adapted to releasably lock a tool, such as a drill or reamer, within the tailstock spindle of a lathe or the like to thereby prevent relative rotation between the tool and spindle. The holding apparatus comprises a supporting arm adapted to be clamped about the spindle, a mounting arm adapted to be secured to the tool, and an interconnecting rod which permits the supporting arm and mounting arm to freely move relative to each other in parallel planes such that the mounting arm becomes automatically centered about the axis of the tool.

9 Claims, 4 Drawing Figures

SELF-CENTERING TOOL HOLDING APPARATUS

The present invention relates to a tool holding or locking apparatus for use in association with a machine tool, such as an engine lathe, turret lathe, or vertical boring mill.

In the use of various machine tools, it is common to mount a drill, reamer, center, or other tool in the tailstock spindle such that the tool is held stationary while the workpiece is rotated. The tailstock spindle incorporates a tapered socket adapted to matingly receive the shank of the tool, and the frictional forces between the socket and shank serve to resist relative rotation as the drill engages the rotating workpiece. However, the frictional forces are often insufficient to prevent relative rotation, resulting in scarring and damage to both the tool shank and spindle socket.

In an effort to prevent the above described relative rotation, it is common to mount a lathe dog on the tool and position the dog so that it abuts the carriage and thereby is precluded from rotation. This procedure is unsatisfactory, however, since the dog has limited holding power and it must be assembled to and removed from the tool at the end of each machining operation. Also, the carriage must be accurately located to properly engage the dog.

It has also been proposed to employ a tool holder such as is illustrated in Ingram U.S. Pat. No. 3,691,883 to prevent rotation of the tool. As illustrated in this patent, the holder comprises a cylindrical sleeve which is adapted to be positioned about the spindle and which includes a key and set screw to secure the same thereto, and a coaxial and integral sleeve adapted to surround the tool and having a number of set screws for engaging the tool. This device is also unsatisfactory however since it must be removed each time the tool is changed, for example, from a drill to a center, or to a drill chuck, thereby requiring extra procedures by the operator. Also, the set screw arrangement is difficult to align and center about the tool, thereby often resulting in lateral stress being applied to the tool by the holder. This, of course, weakens the tool, and can result in its ultimate failure.

It is accordingly an object of the present invention to provide a tool holding apparatus which effectively locks the tool within the socket in a tailstock spindle, and which does not suffer from the above noted disadvantages of prior devices of this nature.

It is another object of the present invention to provide a tool holding apparatus of the described type and which is adapted to be automatically centered about the axis of the tool upon application thereto so that no lateral stresses are applied to the tool by the apparatus.

It is a more particular object of the present invention to provide a tool holding apparatus wherein the portion thereof which is adapted to engage the tool may be translated and held in a nonoperative position, thereby permitting the holder to remain in assembled relation on the spindle during periods of non-use to thereby avoid repeated assembly and disassembly operations.

It is still another object of the present invention to provide a tool holding apparatus of the described type which is adapted to engage the tool at a selected location along the axis thereof, to thereby avoid any possible defacing of the size or other legend which may be printed on the tool.

These and other objects and advantages of the present invention are achieved in the embodiment illustrated herein by the provision of an apparatus which includes a supporting arm having a transverse opening which is adapted to coaxially receive the tailstock spindle therethrough, means for releasably securing the supporting arm to the spindle, a mounting arm having a transverse opening which is adapted to coaxially receive a tool therethrough, means for releasably securing the mounting arm to the tool, and means for interconnecting the supporting arm and mounting arm such that the arms may be freely moved relative to each other in parallel planes with the axes of the two openings extending generally parallel to each other, and while precluding relative rotation of the arms about the two axes.

Some of the objects of the invention having been stated, others will appear as the description proceeds, when taken in connection with the accompanying drawings, in which FIG. 1 is a perspective view of a typical engine lathe mounting a tool holding apparatus embodying the features of the present invention;

Figure 1:
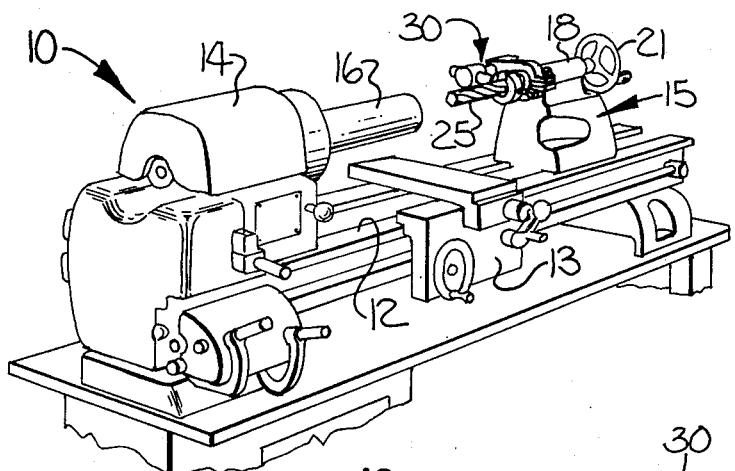

Referring more specifically to the drawings, a conventional engine lathe is indicated generally at 10 in FIG. 1, and comprises a lathe bed 12, carriage 13, headstock 14, and tailstock 15. The headstock 14 includes a chuck (not shown) for mounting a workpiece 16, the workpiece being adapted to be rotated about a horizontal axis in the conventional manner.

The tailstock 15 includes a fixed outer sleeve 18, and a spindle 20 which is adapted to be translated forwardly and rearwardly along a horizontal axis by means of the spindle wheel 21. The spindle 20 includes a tapered or conical socket 22, and a keyway 23 which is adapted to engage a mating key (not shown) in the sleeve 18 for preventing relative rotation. As illustrated, the spindle 20 of the lathe mounts a conventional drill 25, with the tapered shank of the drill being disposed within the socket 22.

The apparatus of the present invention is indicated generally at 30, and comprises a supporting arm 32 which is adapted to be mounted on the spindle 20, a mounting arm 34 adapted to engage the tool 25, and a rod 36 interconnecting the supporting arm and mounting arm.

The supporting arm 32 comprises a first transverse cylindrical opening 37 defining a first axis, the opening 37 being adapted to coaxially receive the spindle 22 therethrough. In order to releasably secure the supporting arm to the spindle, there is provided a transverse slot 38 extending into the supporting arm and communicating in a radial direction with the opening 37 to thereby define bifurcated arm segments 39, 40. More particularly, the slot 38 extends completely across or through the opening 37 so as to communicate with opposite sides of the opening, and the slot terminates in a small transverse cylindrical bore 42 on the remote side of the opening. By this arrangement, the bifurcated arm segments are highly flexible and define a spring-like clamping mechanism. The free ends of the arm segments 39, 40 mount a socket head screw 43 for drawing the arm segments toward each other to thereby reduce the diameter of the opening 37 and permit the supporting arm to be releasably clamped about the spindle 22.

The supporting arm 32 further comprises a key 44 carried along the periphery of the opening 37, the key 44 being disposed generally parallel to the axis of the opening 37 so as to be adapted to be received within the keyway 23 of the spindle 20. The opposite end of the supporting arm includes a second transverse cylindrical opening 45 which defines a second axis which extends parallel to the axis defined by the first opening 37. A slot 46 extends laterally across and through the second opening and terminates in a transverse bore 47 in a manner similar to the slot 38 to thereby provide a similar spring-like clamping mechanism. Also, two socket head screws 48 are mounted across the slot 46 for the purpose of closing the opening 45 in a manner apparent from the drawings.

The rod 36 is disposed within the opening 45 of the supporting arm 32, the rod being axially slidable and rotatable within the opening 45 when the screws 48 are untightened. The rod also includes a transverse cylindrical opening 51 adjacent the remote free end 52 thereof, the opening 51 extending radially through the rod 36 and perpendicular to the axis thereof.

The mounting arm 34 comprises a cylindrical shank portion 54, and an enlarged end portion 55 of C-shaped configuration. More particularly, the shank portion 54 is closely received within the opening 51 of the rod 36 so as to permit relative linear movement along a direction perpendicular to the axis of the rod, as well as relative rotational movement therebetween. The C-shaped end portion 55 is defined by a cylindrical opening 56 which extends therethrough, the axis of the opening 56 extending perpendicular to the axis of the shank portion 54 and parallel to the axis of the rod 36.

Figure 4:
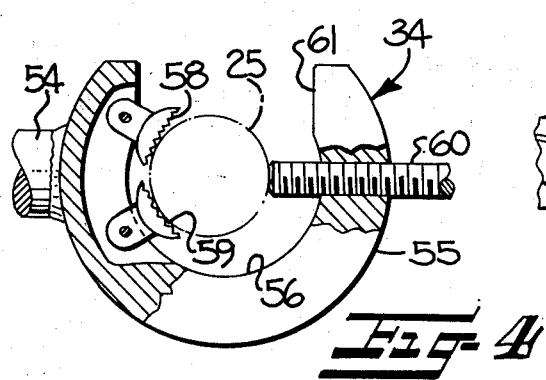
FIG. 4 is a fragmentary front elevation view, partly sectioned, illustrating the end portion of the mounting arm of the present invention.

The mounting arm 34 further includes means mounted within the opening 56 for releasably securing the mounting arm to the tool 25 when the tool is disposed therewithin. This securing means comprises a pair of pivotally mounted jaws 58, 59 positioned within the opening 56, each of the jaws having a serrated outer surface facing the axis of the opening 56 as best seen in FIG. 4. A clamping set screw 60 is threadably carried by the arm 34 and extends radially into the opening 56 from a direction opposite the jaws. As will be apparent, the tool 25 may be selectively clamped or released by threading the screw 60 toward and away from the jaws 58, 59. Also, the cut-out or open segment 61 permits the tool to pass laterally into the opening 56.

In use, the apparatus 30 may be mounted about the spindle 20 either before or after the shank of the tool 25 is inserted in the socket 22. More particularly, the opening 37 of the supporting arm 32 is slipped coaxially over the spindle 20, with the key 44 being fitted within the keyway 23. The arm 32 is then clamped in position by means of the screw 43. In this regard, it will be noted that the clamping arrangement by which the arm 32 engages the spindle 20 will effectively preclude any scarring of the outer surface of the spindle.

Figure 2:
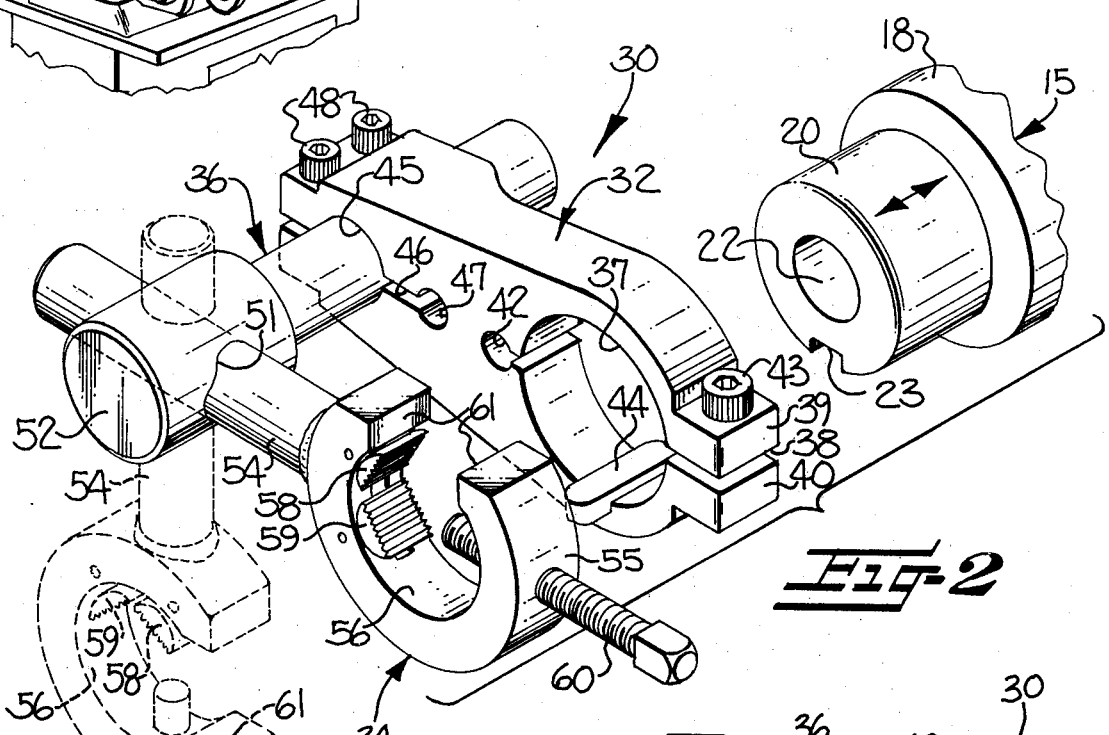
FIG. 2 is an exploded perspective view of the tool holding apparatus and spindle of the lathe as seen in FIG. 1.
Figure 3:
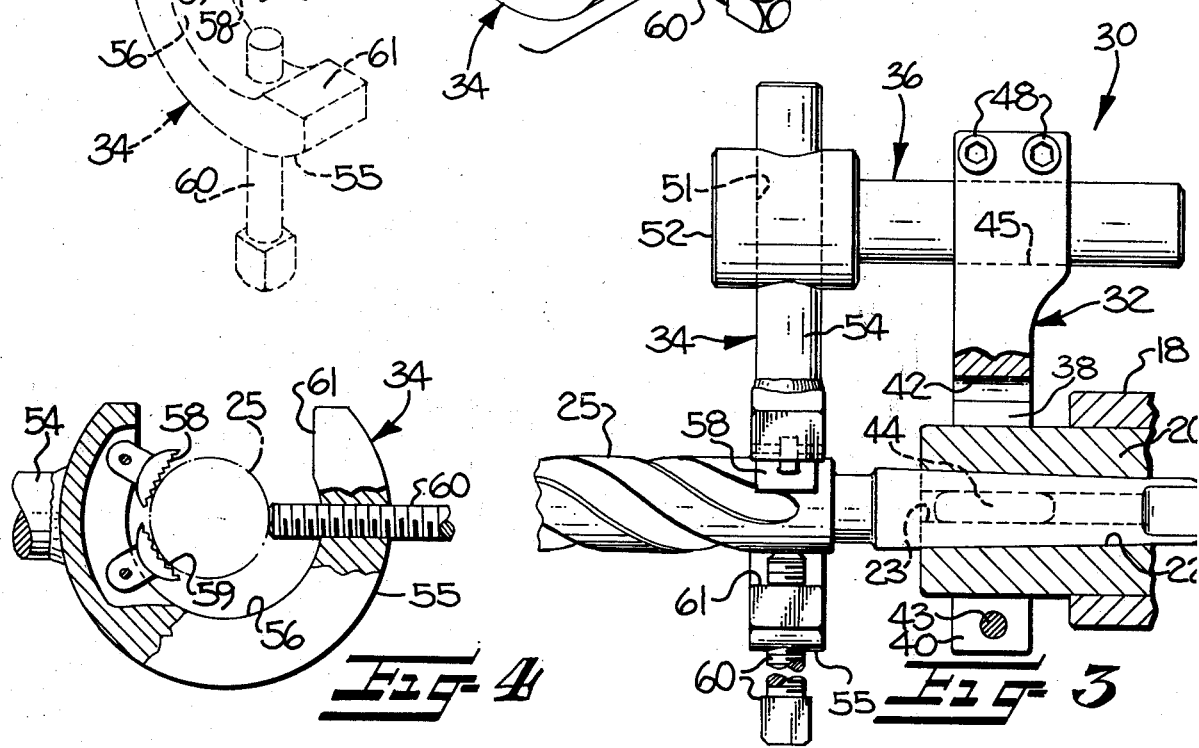
FIG. 3 is a top plan view, partly sectioned, illustrating the tool holding apparatus assembled to the spindle and secured to a drill which is mounted within the socket of the spindle.

The mounting arm 34 is then brought into engagement with the tool 25 by rotating the arm 34 about the axis of the rod 36 from the dotted line position to the solid line position as seen in FIG. 2. In actual practice, the arm 34 is preferably initially positioned in an upright orientation with the C-shaped end portion 55 positioned above the rod 36 to prevent the arm 34 from falling downwardly from the rod 36. In such case, the arm 34 is rotated downwardly onto the tool, and the open segment 61 faces downwardly. The opposite orientation is shown in the drawings for clarity of illustration.

The mounting arm 34 is then secured to the tool 25 by rotating the screw 60 toward the jaws 58, 59 to clamp the tool therebetween. During this process, it will be noted that the mounting arm 34 is free to effectively move or float in all directions within a plane which includes the axis of the shank portion 54 and lies perpendicular to the axis of the tool 25. More particularly, the mounting arm 34 may be translated along the axis of the shank portion 54 by sliding the arm 34 into an out of the opening 51 in the rod 36. Concurrently, the end portion 55 of the mounting arm 34 can be moved at right angles to the above linear direction by rotating the arm 34 about the axis of the rod 36, with the rod 36 also rotating within the opening 45 of the supporting arm 32. This arrangement permits the apparatus 30 to become automatically centered about the axis of the tool 25 so that no lateral stresses are applied to the tool by the apparatus. Also, the fact that the shank portion 54 of the arm 34 and the opening 51 of the rod 36 each have a cylindrical cross sectional configuration permits relative rotation about the common axis to further facilitate the centering of the end portion 55 about the tool.

With the tool 25 clamped in the manner described above, it will be understood that the tool is effectively locked within the socket 22 of the spindle 20 and prevented from rotating relative thereto since the apparatus 30 permits no relative rotation between the arms 32 and 34 about the axes of the openings 37 and 56, such axes being coaxially disposed with the axis of the spindle 20 and tool 25.

In the case of a drilling operation, it is common for the drill to be pulled axially from the socket 22 upon the drill breaking through on the back side of the workpiece. Where the apparatus 10 of the present invention is employed, this pulling force can result in the drill 25, arm 34, and rod 36 being pulled completely away from the socket 22 and arm 32. To prevent this from occurring, the screws 48 on the arm 32 are preferably tightened after the full diameter of the drill has entered the workpiece.

When the apparatus 30 is not to be used in a particular machining operation, it may be conveniently translated to a non-operative or storage position without removing the apparatus from the spindle 20. For example, the mounting arm 34 may be rotated to an upright or vertical position wherein the end portion 55 is above the rod 36, and the screws 48 tightened to preclude rotation of the rod 36 and thereby retain the mounting arm 34 in this out-of-the-way position. Thus the numerous assembly and disassembly operations inherent in the above-described prior art devices are avoided.

As a further aspect and advantage of the present invention, it will be noted that the mounting arm 34 and rod 36 are initially free to be translated toward and away from the spindle 20 by sliding the rod into or out of the opening 45 in the supporting arm 32. This arrangement permits the clamping jaws 58, 59 of the mounting arm 34 to be located on a non-critical portion of the tool, to thereby avoid defacing a size legend or the like on the tool. Further, this arrangement permits the apparatus 30 to be readily adjusted to engage various tools.

In the drawings and specification, there has been set forth a preferred embodiment of the invention, and although specific terms are employed, they are used in a generic and descriptive sense only and not for purposes of limitation.

That which is claimed is:

1. An apparatus for releasably holding a tool within the socket in a tailstock spindle of a lathe or the like to thereby prevent relative rotation between the tool and spindle, and characterized by the ability to be automatically centered about the axis of the tool so that no lateral stresses are applied to the tool by the apparatus, said apparatus comprising a supporting arm having a transverse opening defining a first axis and which is adapted to coaxially receive the tailstock spindle of a lathe or the like therethrough, and means for releasably securing said supporting arm to such spindle with the spindle extending coaxially through said opening, a mounting arm having a transverse opening defining a second axis and which is adapted to coaxially receive a tool or the like therethrough, and means for releasably securing said mounting arm to such tool with the tool extending coaxially through said mounting arm opening, and means for interconnecting said supporting arm and mounting arm such that said arms may be freely moved relative to each other in parallel planes with said first and second axes extending parallel to each other to thereby permit the axes to move into coaxial alignment, while precluding relative rotation of said arms about said first and second axes, said interconnecting means comprising a cylindrical rod defining a rod axis, means for mounting said rod to one of said supporting arm and mounting arm such that the rod extends parallel to the associated opening axis and while permitting relative linear movement along a direction perpendicular to said rod axis, and means for mounting said rod to the other of said supporting arm and mounting arm such that the rod extends parallel to the associated opening axis and while permitting relative rotation about said rod axis.

2. The apparatus as defined in claim 1 wherein said means for releasably securing said supporting arm to the spindle comprises a slot extending into said supporting arm and communicating with said opening to define bifurcated arm segments, and means for drawing said arm segments toward each other to thereby reduce the diameter of said supporting arm opening such that said supporting arm may be clamped about the spindle.

3. The apparatus as defined in claim 2 wherein said supporting arm further comprises a key carried along the periphery of said supporting arm opening, said key being disposed generally parallel to said first axis so as to be adapted to be received within a keyway in the spindle.

4. The apparatus as defined in claim 3 wherein said means for releasably securing said mounting arm to the tool comprises at least one serrated jaw carried within said mounting arm opening and facing said second axis, and means for clamping the tool against said serrated jaw.

5. The apparatus as defined in claim 4 wherein said mounting arm further comprises an open segment communicating with said mounting arm opening and adapted to permit the tool to pass laterally into such opening.

6. An apparatus for releasably holding a tool within the socket in a tailstock spindle of a lathe or the like to thereby prevent relative rotation between the tool and spindle, and characterized by the ability to be automatically centered about the axis of the tool so that no lateral stresses are applied to the tool by the apparatus, said apparatus comprising a supporting arm having a first transverse cylindrical opening defining a first axis and which is adapted to coaxially receive the tailstock spindle of a lathe or the like therethrough, a second transverse cylindrical opening defining a second axis which extends parallel to said first axis, and means for releasably securing said supporting arm to the spindle with the spindle extending coaxially through said first opening, a cylindrical interconnecting rod closely received within said second opening of said supporting arm so as to be coaxially disposed therein and while permitting relative rotational movement about the axis of said interconnecting rod and relative axial movement along the axis of said interconnecting rod, said rod having a transverse opening adjacent a remote free end thereof and extending radially through said rod and perpendicular to the axis thereof, a mounting arm comprising a shank portion and an enlarged end portion, said shank portion being closely received within said rod opening so as to permit relative linear movement along a direction perpendicular to the axis of said rod, and a transverse opening extending through said enlarged end portion of said mounting arm to define a mounting arm opening axis which extends parallel to the axis of said cylindrical rod, and means for releasably securing said mounting arm to a tool disposed within said mounting arm opening, whereby said supporting arm and mounting arm may be freely moved relative to each other in parallel planes to thereby permit said supporting arm first axis and said mounting arm opening axis to move into coaxial alignment while precluding relative rotation of said arms about said axes.

7. The apparatus as defined in claim 6 wherein said rod opening and said shank portion of said mounting arm each has a cylindrical cross-sectional configuration such that relative rotation about the common axis is permitted.

8. The apparatus as defined in claim 7 wherein said supporting arm further comprises means for selectively locking said rod within said second opening to thereby preclude relative rotational and axial movement between said rod and supporting arm.

9. The apparatus as defined in claim 8 wherein said means for releasably securing said supporting arm to the spindle comprises a slot extending into said supporting arm and radially through said first opening so as to communicate with opposite sides of said first opening to thereby define flexible, bifurcated arm segments, means for drawing said arm segments toward each other, and a key carried along the periphery of said first opening and being adapted to be received within a keyway in the spindle.

* * * * *